US012612484B2

(12) United States Patent
Chae et al.

(10) Patent No.: US 12,612,484 B2

(45) Date of Patent: Apr. 28, 2026

(54) IONOMER FOR FUEL CELL HAVING DENSE SULFONIC ACID GROUPS AND METHOD OF PREPARING SAME

(71) Applicants: Hyundai Motor Company, Seoul (KR); Kia Corporation, Seoul (KR); INDUSTRY-ACADEMIC COOPERATION FOUNDATION GYEONGSANG NATIONAL UNIVERSITY, Jinju-si (KR)

(72) Inventors: Il Seok Chae, Seoul (KR); Jong Kil Oh, Yongin-si (KR); Ki Hyun Kim, Yongin-si (KR); Han Sol Ko, Changwon-si (KR); Mi Jeong Kim, Gimhae-si (KR)

(73) Assignees: Hyundai Motor Company, Seoul (KR); Kia Corporation, Seoul (KR); INDUSTRY-ACADEMIC COOPERATION FOUNDATION GYEONGSANG NATIONAL UNIVERSITY, Jinju-si (KR)

( * ) Notice: Subject to any disclaimer, the term of this patent is extended or adjusted under 35 U.S.C. 154(b) by 500 days.

(21) Appl. No.: 18/311,522

(22) Filed: May 3, 2023

(65) Prior Publication Data

US 2024/0182621 A1 Jun. 6, 2024

(30) Foreign Application Priority Data

Nov. 10, 2022 (KR) ........................ 10-2022-0149113

(51) Int. Cl.

*C08F 293/00* (2006.01)
*H01M 4/90* (2006.01)
*H01M 8/10* (2016.01)
*H01M 8/1032* (2016.01)
*H01M 8/1039* (2016.01)

(52) U.S. Cl.

CPC ......... *C08F 293/00* (2013.01); *H01M 4/9008* (2013.01); *H01M 8/1032* (2013.01); *H01M 8/1039* (2013.01); *H01M 2008/1095* (2013.01)

(58) Field of Classification Search

CPC . C08F 293/00; H01M 4/9008; H01M 8/1032; H01M 8/1039; H01M 8/1041; H01M 2008/1095

See application file for complete search history.

(56) References Cited

U.S. PATENT DOCUMENTS

| | | | |
|---|---|---|---|
| 2020/0308341 A1 | 10/2020 | Yan et al. |
| 2022/0025095 A1 | 1/2022 | Lee et al. |
| 2022/0093953 A1 | 3/2022 | Chae et al. |

FOREIGN PATENT DOCUMENTS

| | | | |
|---|---|---|---|
| JP | 2022526900 A | 5/2022 |
| KR | 101267905 B1 | 5/2013 |
| KR | 102290296 B1 | 8/2021 |
| KR | 20220038839 A | 3/2022 |

*Primary Examiner* — Sarah A. Slifka

(74) *Attorney, Agent, or Firm* — Slater Matsil, LLP

(57) ABSTRACT

In an embodiment, an ionomer includes a partial structure represented by:

[Chemical Formula 1]

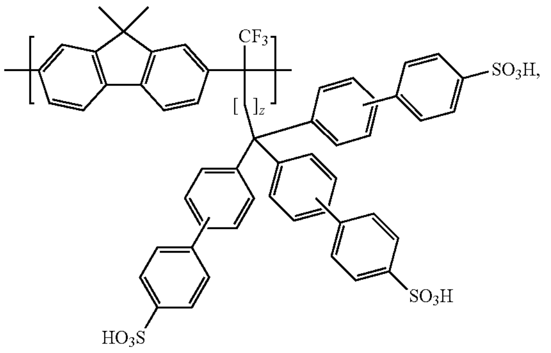

or

[Chemical Formula 2]

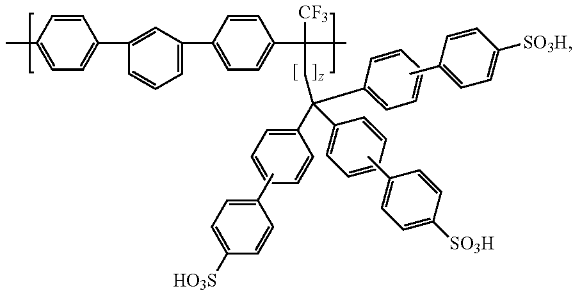

wherein z is an integer of 1 to 10.

19 Claims, 12 Drawing Sheets

| DMSO | DMAc | MeOH | EtOH | 1-Propanol | 2-Propanol |
|---|---|---|---|---|---|
| O | O | O | O | O | O |

* O : Soluble well
X : Not soluble

| Sample | Dry state | Wet state |
| --- | --- | --- |
| Example 1 |  |  |

| WU | Dimensional change (%) | | | |
| --- | --- | --- | --- | --- |
| (%) | $\Delta L$ | $\Delta W$ | $\Delta T$ | $\Delta V$ |
| 327.5 ± 7.6 | 51.9 ± 2.1 | 45.0 ± 5.0 | 112.4 ± 5.1 | 367.6 ±16.3 |

IONOMER FOR FUEL CELL HAVING DENSE SULFONIC ACID GROUPS AND METHOD OF PREPARING SAME

CROSS-REFERENCE TO RELATED APPLICATIONS

This application claims the benefit of Korean Patent Application No. 10-2022-0149113, filed on Nov. 10, 2022, which application is hereby incorporated herein by reference.

TECHNICAL FIELD

The present disclosure relates to an ionomer for a fuel cell having dense sulfonic acid groups and a method of preparing the same.

BACKGROUND

Currently, examples of the polymer electrolyte membrane that is the most widely used may include Nafion, which is a perfluorinated electrolyte membrane by DuPont, and a perfluorinated electrolyte membrane having a porous filled membrane structure by Gore. All thereof are characterized by having a perfluorinated polymer structure. A perfluorinated electrolyte membrane has advantages such as high ionic conductivity and high chemical stability, but is disadvantageous in that the unit price thereof is high due to a complicated manufacturing process and hydrofluoric acid and fluorine-based pollutants are released upon decomposition. Therefore, it is necessary to develop a hydrocarbon-based polymer electrolyte membrane.

Hydrocarbon-based polymer electrolyte membranes have been reported in several documents, but conventional ionomers synthesized through condensation polymerization based on nucleophilic substitution reaction contain heteroatoms in the main chains thereof, resulting in weak chemical bonds and poor phase separation effects, and thus an ion transport channel is not effectively formed and proton conductivity is lowered.

SUMMARY

Embodiments provide an ionomer having excellent chemical stability and high proton conductivity.

Further embodiments provide an ionomer having high solubility in various solvents such as aprotic solvents, alcoholic solvents, and the like.

An embodiment of the present disclosure provides an ionomer for a fuel cell including a partial structure represented by Chemical Formula 1 or Chemical Formula 2.

[Chemical Formula 1]

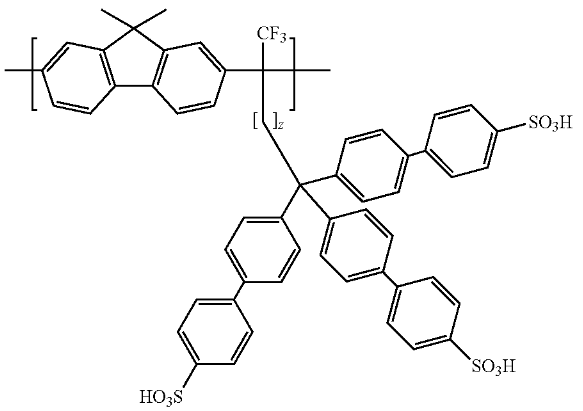

[Chemical Formula 2]

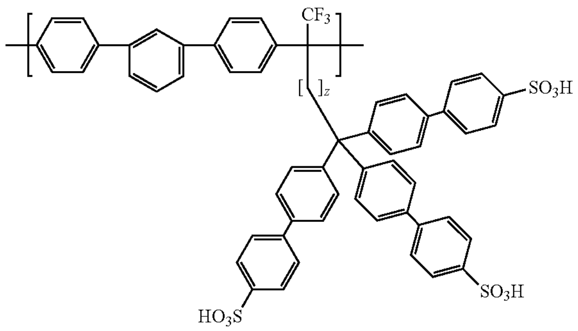

In Chemical Formula 1 and Chemical Formula 2, z may be a number from 1 to 10.

The ionomer may be a compound represented by Chemical Formula 3.

[Chemical Formula 3]
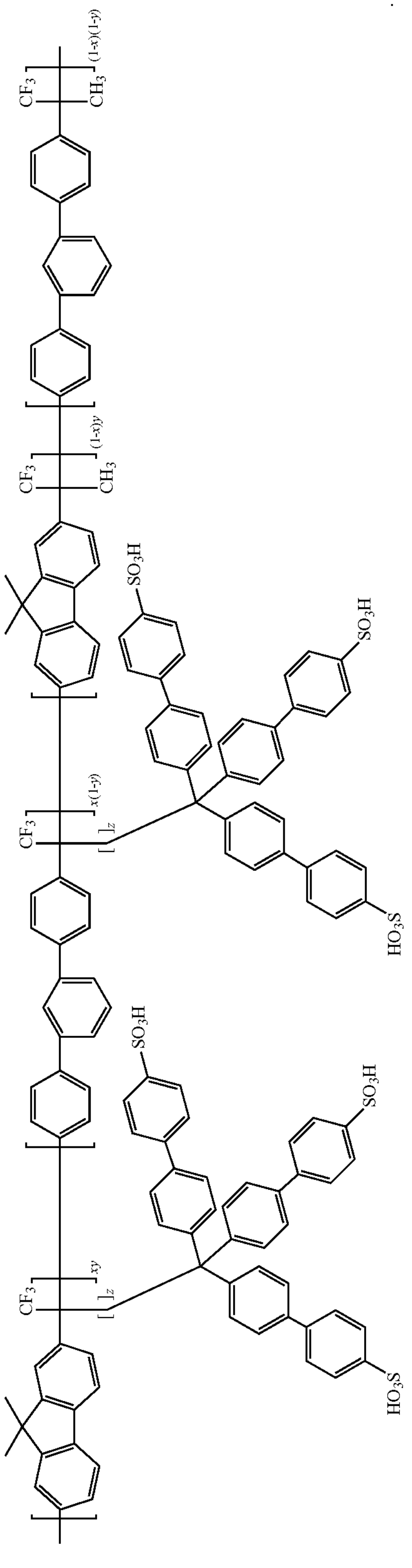

In Chemical Formula 3, x may satisfy $0<x\leq1$, y may satisfy $0\leq y\leq1$, and z may be a number from 1 to 10.

In Chemical Formula 3, x may satisfy $0.1\leq x\leq0.3$.

In Chemical Formula 3, y may satisfy $0.4\leq y\leq0.5$.

Another embodiment of the present disclosure provides a fuel cell including an electrolyte membrane, a cathode disposed on one surface of the electrolyte membrane, and an anode disposed on the remaining surface of the electrolyte membrane, in which at least one of the electrolyte membrane, the cathode, and the anode may include the ionomer described above.

Still another embodiment of the present disclosure provides a method of preparing an ionomer for a fuel cell including preparing a first precursor by reacting a fluorene-based monomer, a terphenyl-based monomer, and a hydrocarbon compound, preparing a second precursor by reacting the first precursor with a triphenyl-based monomer, preparing a third precursor represented by Chemical Formula 6 by introducing a monomer having a sulfonic acid protecting group into the second precursor, and obtaining an ionomer represented by Chemical Formula 3 by removing the sulfonic acid protecting group from the third precursor.

[Chemical Formula 6]
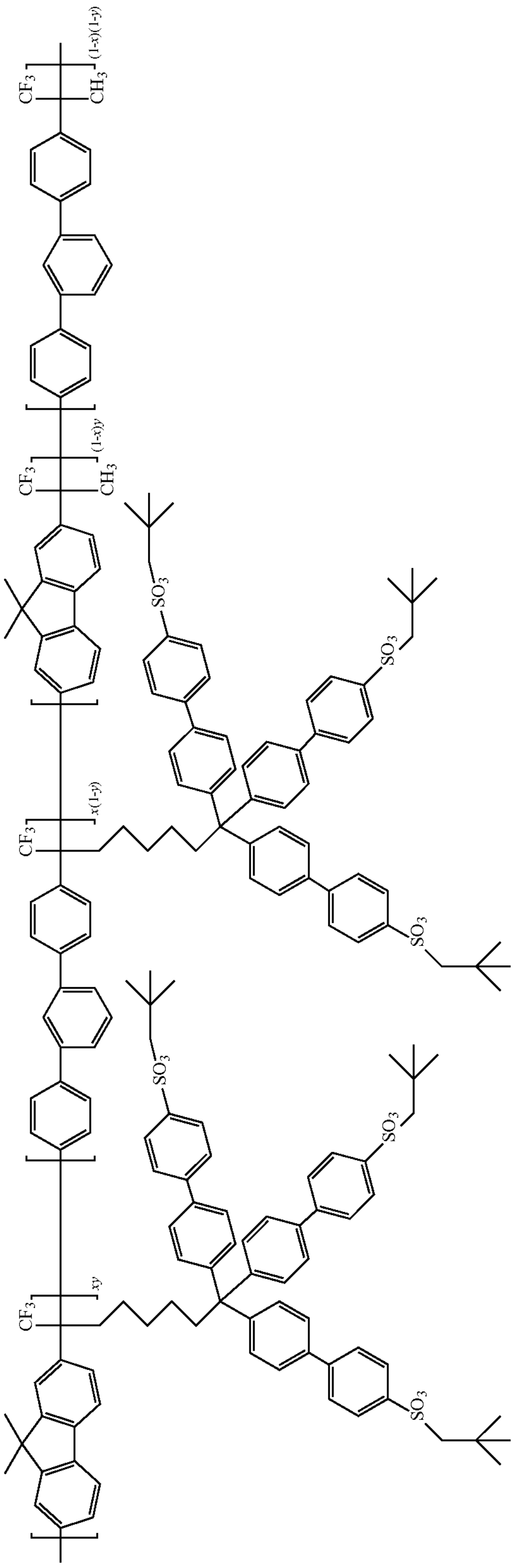
[Chemical Formula 3]
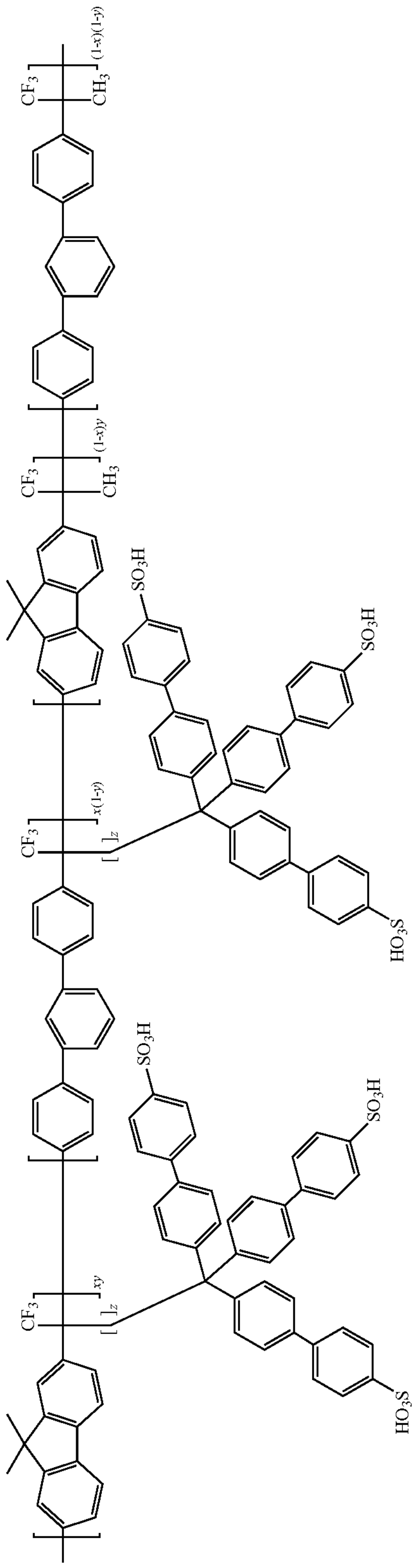

In Chemical Formulas 3 and 6, x may satisfy $0<x\leq 1$, y may satisfy $0\leq y\leq 1$, and z may be a number from 1 to 10.

The first precursor may be a compound represented by Chemical Formula 4.

[Chemical Formula 4]
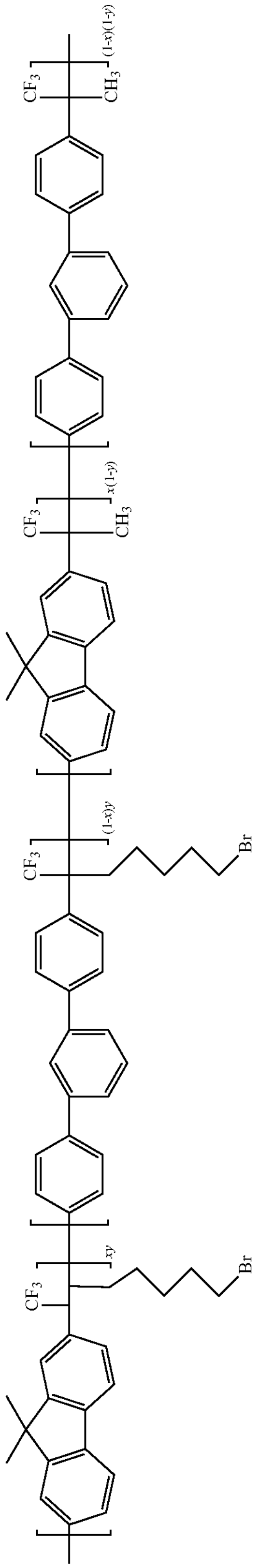

In Chemical Formula 4, x may satisfy $0<x\leq 1$ and y may satisfy $0\leq y\leq 1$.

The second precursor may be a compound represented by Chemical Formula 5.

[Chemical Formula 5]
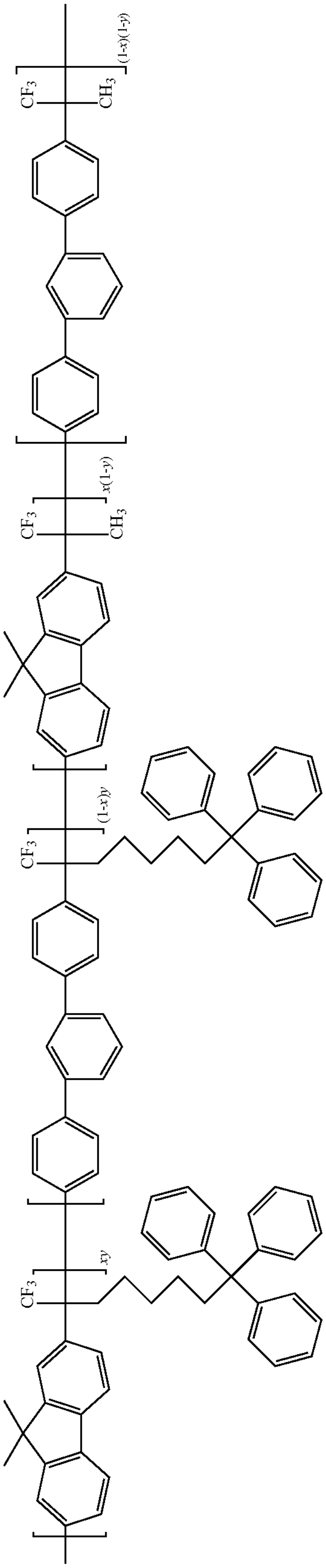

In Chemical Formula 5, x may satisfy $0<x\leq 1$ and y may satisfy $0\leq y\leq 1$.

The monomer having a sulfonic acid protecting group may be a compound represented by Chemical Formula 6a.

[Chemical Formula 6a]

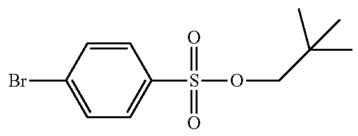

BRIEF DESCRIPTION OF THE DRAWINGS

The above and other features of the present disclosure will now be described in detail with reference to certain exemplary embodiments thereof illustrated in the accompanying drawings, which are given hereinbelow by way of illustration only, and thus are not limitative of the present disclosure, and wherein:

FIG. 1B shows results of 1H-NMR analysis of a monomer having a sulfonic acid protecting group represented by Chemical Formula 6a;

DETAILED DESCRIPTION OF ILLUSTRATIVE EMBODIMENTS

Figure 1A:
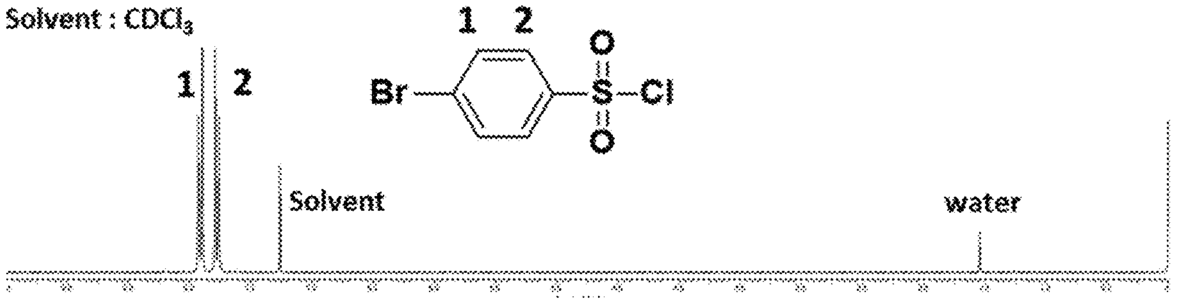
FIG. 1A shows results of 1H-NMR analysis of bromobenzenesulfonic chloride, which is a reactant.

The above and other objects, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as “first”, “second”, etc. may be used herein to describe various elements, these elements are not to be limited by these terms. These terms are only used to distinguish one element from another element. For instance, a “first” element discussed below could be termed a “second” element without departing from the scope of the present disclosure. Similarly, the “second” element could also be termed a “first” element. As used herein, the singular forms are intended to include the plural forms as well, unless the context clearly indicates otherwise.

It will be further understood that the terms “comprise”, “include”, “have”, etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being “on” another element, it may be directly on the other element, or intervening elements may be present therebetween. Similarly, when an element such as a layer, film, area, or sheet is referred to as being “under” another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term “about” in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

An ionomer according to the present disclosure has excellent chemical stability because the entire polymer is composed of only carbon bonds. If there is an aryl ether bond or a benzylic C—H bond having low binding energy in an ionomer for a fuel cell, decomposition may occur under operating conditions of the fuel cell, which is undesirable. The ionomer according to the present disclosure is prepared by a method different from conventional methods, such as synthesizing a main chain through strong acid condensation polymerization and forming a side chain through coupling reaction, and is composed only of carbon bonds and does not cause a problem of decomposition under operating conditions of a fuel cell.

The ionomer according to the present disclosure has a clear phase separation effect and is able to effectively form an ion exchange channel, thereby exhibiting high proton conductivity. The sulfonic acid group plays an important role in the conduction of protons. The sulfonic acid group forms an effective ion exchange channel as the separation between the hydrophobic and hydrophilic groups becomes clear, which is an important factor for high proton conductivity. The ionomer according to the present disclosure has a clear phase separation effect by virtue of a flexible branched structure in the hydrophobic main chain and dense sulfonic acid groups at the end of the branch. In addition, the solubility problem and the crosslinking problem occurring during the sulfonation process when synthesizing a conventional polymer having a dense sulfonic acid group structure may be solved by introducing a monomer having a sulfonic acid protecting group and Suzuki-Miyaura coupling reaction.

The ionomer according to the present disclosure exhibits high solubility in various solvents. The ionomer according to the present disclosure exhibits high solubility even in aprotic solvents and alcoholic solvents through a fluorene- and m-terphenyl-based tilted main chain and branched structure, which is advantageous for high processability and eco-friendly processes.

The ionomer according to the present disclosure may include a partial structure represented by Chemical Formula 1 or Chemical Formula 2 below.

[Chemical Formula 1]

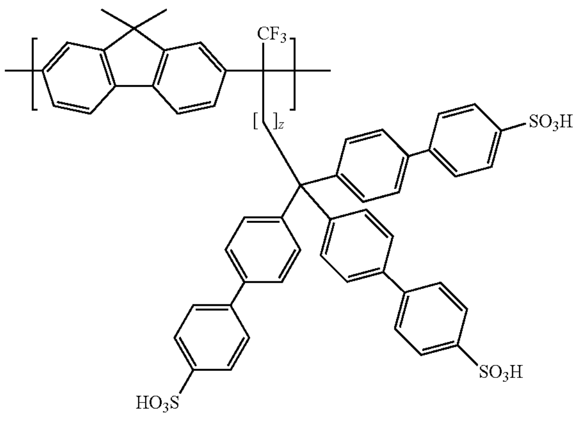

In Chemical Formula 1, z may be an integer of 1 to 10.

[Chemical Formula 2]

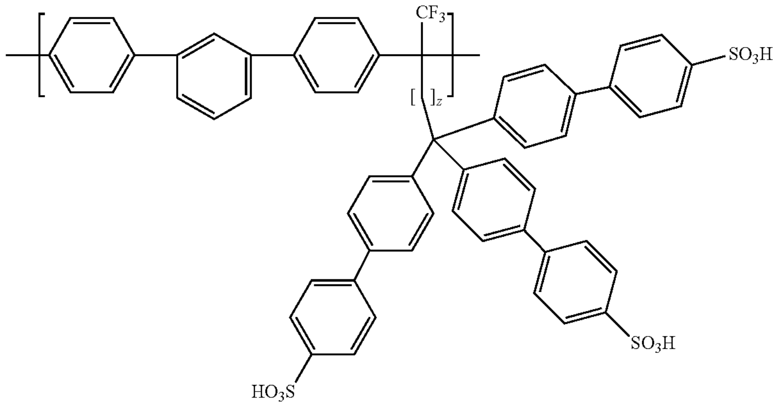

In Chemical Formula 2, z may be an integer of 1 to 10. Specifically, the ionomer may include a polymer represented by Chemical Formula 3 below.

[Chemical Formula 3]

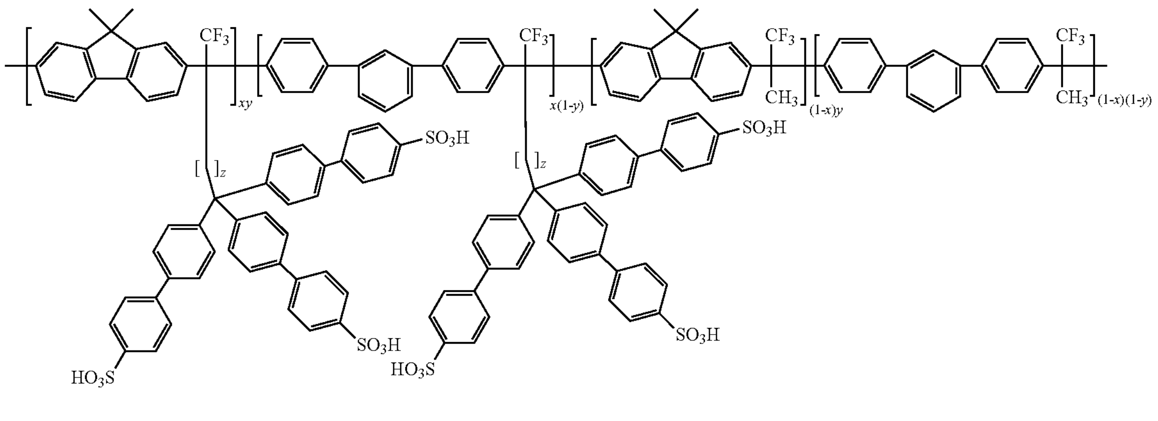

In Chemical Formula 3, x may satisfy $0<x\leq 1$, y may satisfy $0\leq y\leq 1$, and z may be an integer of 1 to 10.

Here, x may represent the proportion of the side chain, y may represent the ratio of fluorene to m-terphenyl, and z may represent the length of the side chain.

More specifically, in Chemical Formula 3, x may satisfy $0.1<x\leq 0.3$ and y may satisfy $0.4\leq y\leq 0.5$.

A fuel cell according to the present disclosure may include an electrolyte membrane, a cathode disposed on one surface of the electrolyte membrane, and an anode disposed on another surface of the electrolyte membrane. At least one of the electrolyte membrane, cathode, and anode may include the ionomer.

A method of preparing the ionomer according to the present disclosure may include preparing a first precursor by reacting a fluorene-based monomer, a terphenyl-based monomer, and a hydrocarbon compound, preparing a second precursor by reacting the first precursor with a triphenyl-based monomer, preparing a third precursor by introducing a monomer having a sulfonic acid protecting group into the second precursor, and obtaining an ionomer represented by Chemical Formula 3 by removing the sulfonic acid protecting group from the third precursor.

The first precursor may include a polymer represented by Chemical Formula 4 below.

[Chemical Formula 4]

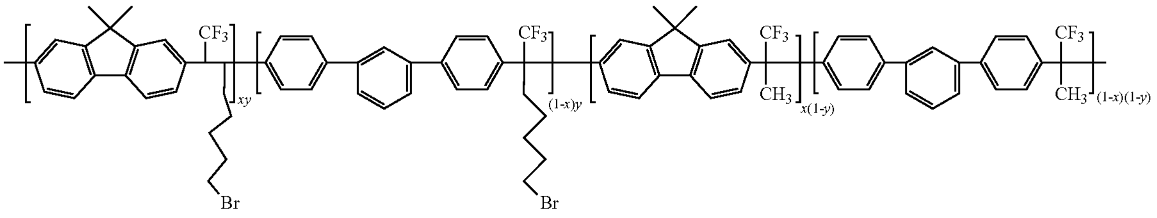

In Chemical Formula 4, x may satisfy $0<x\leq 1$ and y may satisfy $0\leq y\leq 1$.

The second precursor may include a polymer represented by Chemical Formula 5 below.

[Chemical Formula 5]

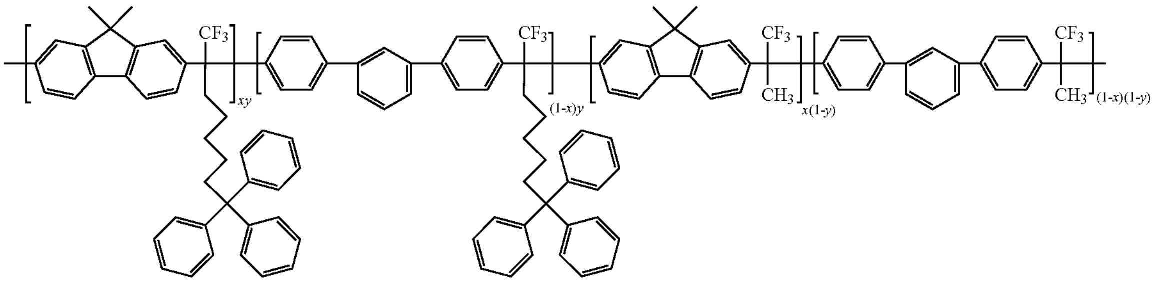

In Chemical Formula 5, x may satisfy 0<x≤1 and y may satisfy 0≤y≤1.

The third precursor may include a polymer represented by Chemical Formula 6 below. Here, the sulfonic acid protecting group may include a neopentyl group.

[Chemical Formula 6]

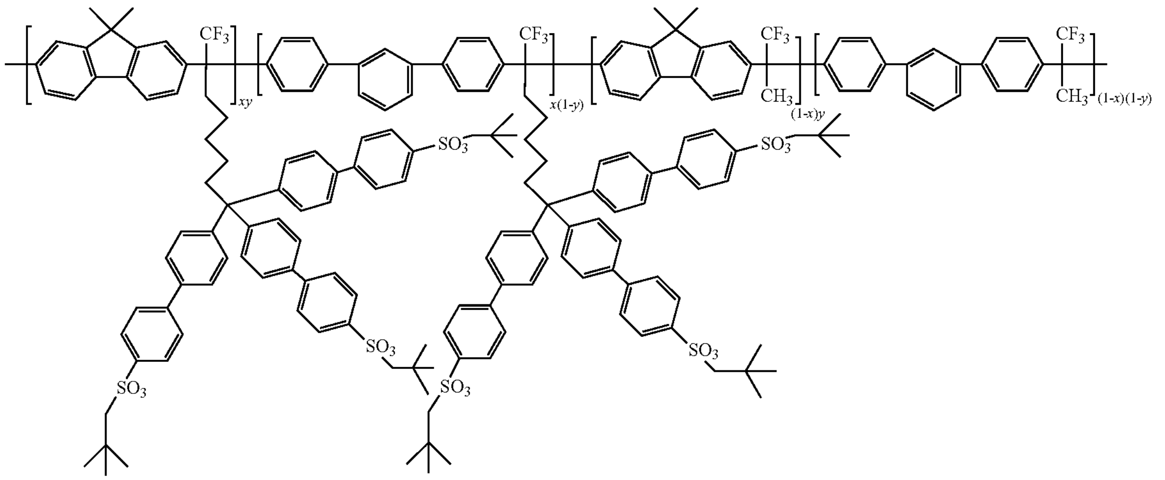

In Chemical Formula 6, x may satisfy 0<x≤1, y may satisfy 0≤y≤1, and z may be an integer of 1 to 10.

The ionomer according to the present disclosure may be obtained by removing the sulfonic acid protecting group from the third precursor.

Details of the method of preparing the ionomer will be described in the following Preparation Examples.

Preparation Example 1

(Preparation of monomer having sulfonic acid protecting group) A monomer having a neopentyl group as a sulfonic acid protecting group was prepared as shown in Scheme 1 below.

[Scheme 1]

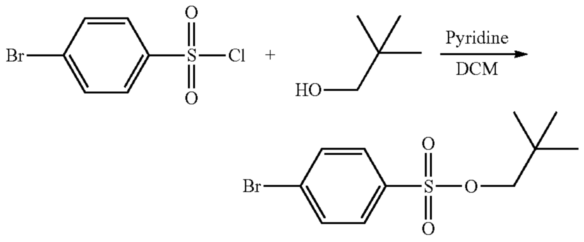

Bromobenzenesulfonic chloride (58.7 mmol, 15 g) and neopentyl alcohol (88.1 mmol, 7.8 g) were provided as reactants. Pyridine (176.1 mmol, 14.2 mL) as a catalyst and the reactants were added to dichloromethane (68.5 mL) as a solvent and allowed to react with stirring at room temperature for about 18 hours. The resulting product was separated into an aqueous layer and an organic layer using water and diethyl ether, followed by washing with a 1 M HCl aqueous solution and a saturated $NaHCO_3$ aqueous solution and then drying using a vacuum rotary evaporator, thereby obtaining a monomer having a sulfonic acid protecting group represented by Chemical Formula 6a below.

[Chemical Formula 6a]

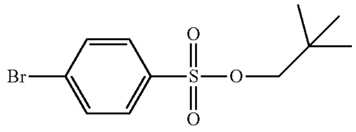

Figure 1B:
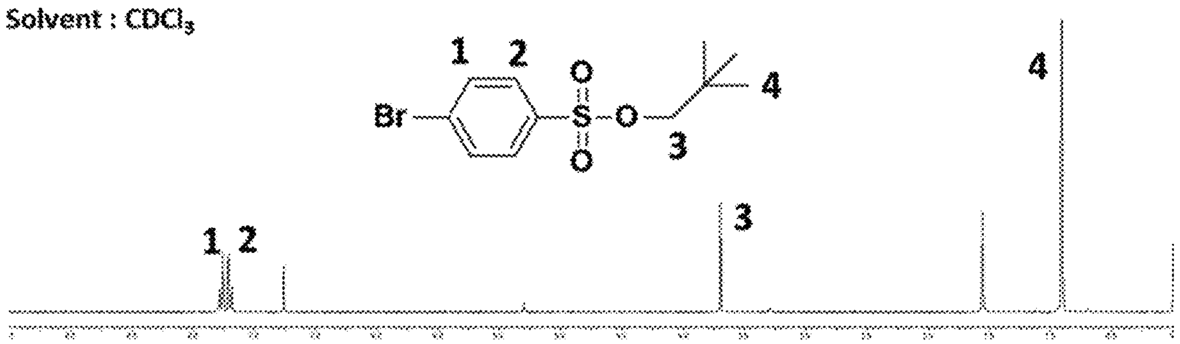

FIG. 1A shows results of $^1$H-NMR analysis of bromobenzenesulfonic chloride, which is a reactant. FIG. 1B shows results of $^1$H-NMR analysis of the monomer having a sulfonic acid protecting group represented by Chemical Formula 6a. It can be seen that the positions of peaks 1 and 2 of the phenyl ring appearing in bromobenzenesulfonyl chloride are changed in FIG. 1B. Also, in FIG. 1B, peaks 3 and 4 of the alkyl portion of neopentyl appear.

(Preparation of first precursor) A first precursor represented by Chemical Formula 4 was prepared as shown in Scheme 2 below.

[Scheme 2]
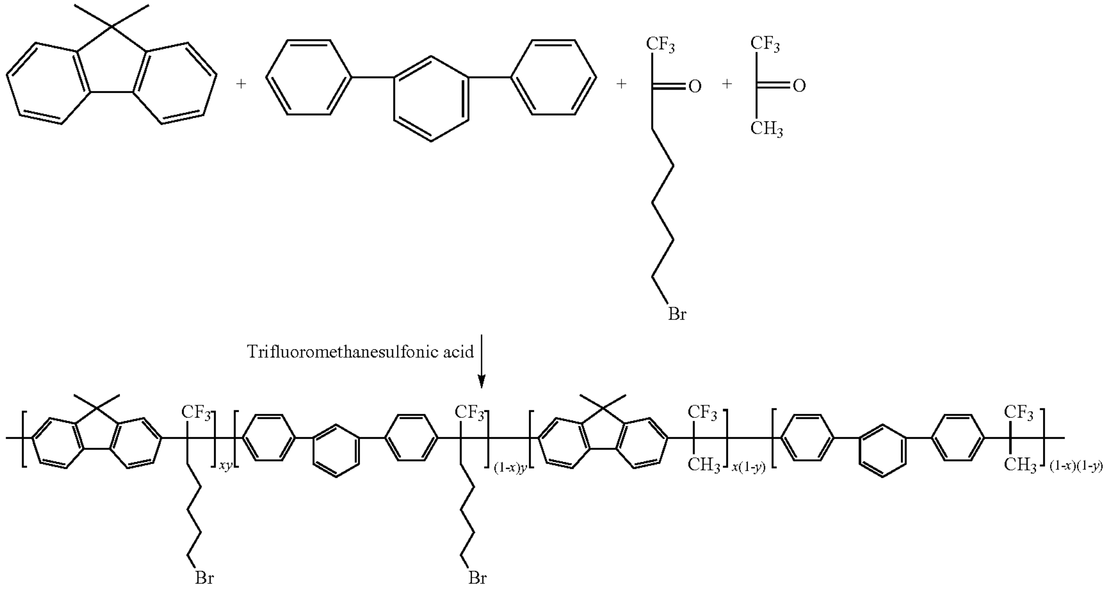
9,9-Dimethylfluorene (1 g, 5.15 mmol), m-terphenyl (2.8 g, 12.01 mmol), 7-bromo-1,1,1-trifluoroheptan-2-one (2.8 g, 1.15 mmol), and 1,1,1-trifluoroacetone (0.69 mL, 7.72 mmol) were weighed so that x was 0.3 and y was 0.5 in Scheme 2.
Trifluoromethanesulfonic acid (TFSA) (15.18 mL, 171.58 mmol) was provided as a catalyst.
Dichloromethane (DCM) as a solvent was provided in an amount of 15 wt % based on the weight of the monomer.
[Scheme 3]
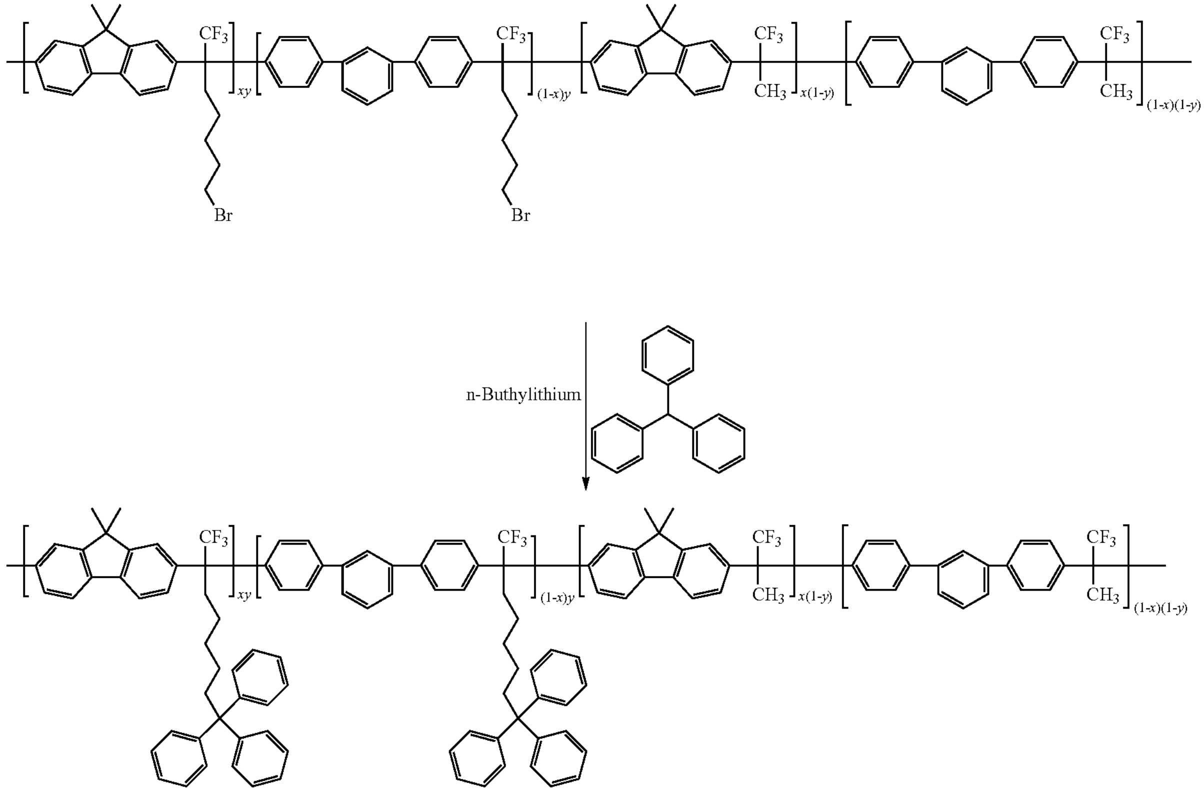

The monomer and the catalyst were added to the solvent, allowed to stand at about 5° C. for about 30 minutes, and then allowed to react at room temperature for about 1 hour and 30 minutes to synthesize a first precursor. The reaction product was precipitated in methanol, washed several times with methanol, and dried in a vacuum oven at about 40° C., thereby obtaining a first precursor.

(Preparation of second precursor) A second precursor represented by Chemical Formula 5 was prepared as shown in Scheme 3 below.

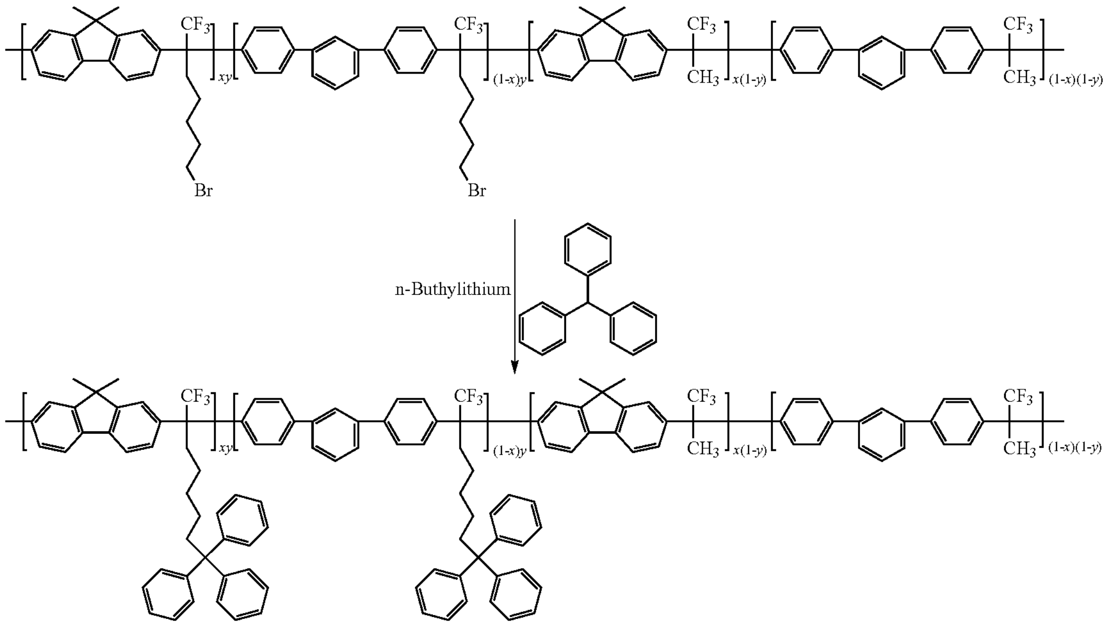

The first precursor (5 g) and triphenylmethane (4.8 g, 19.68 mmol) as reactants, n-butyllithium (n-BuLi, 2.5 M in hexane, 7.87 mL) as a catalyst, and tetrahydrofuran (THF, 99.3 mL) as a solvent were allowed to react for about 24 hours to synthesize a second precursor. The reaction product was precipitated in methanol, washed several times with methanol, and dried in a vacuum oven at about 40° C., thereby obtaining a second precursor.

Figure 2:
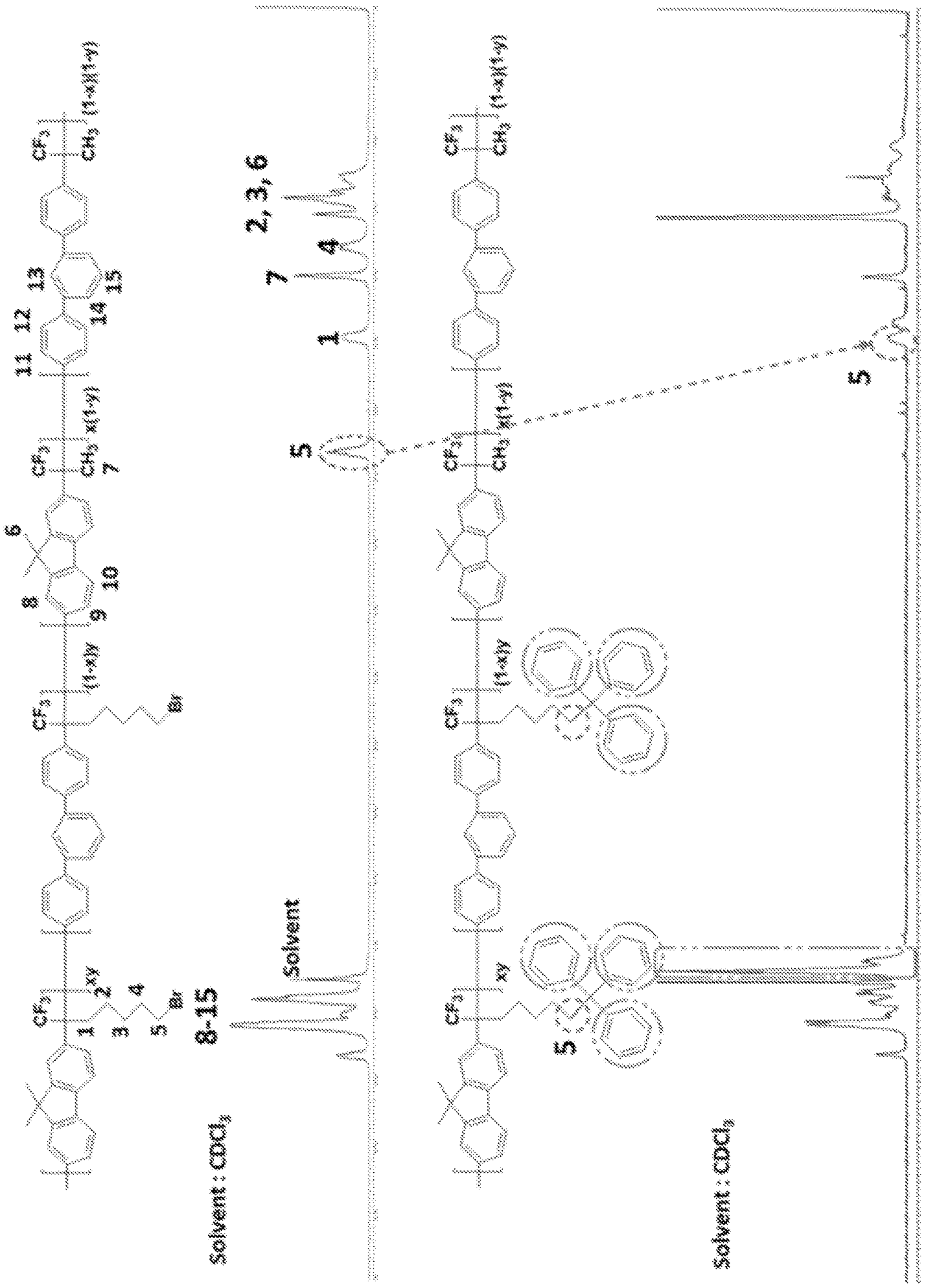
FIG. 2 shows results of 1H-NMR analysis of the first precursor and the second precursor.

FIG. 2 shows results of 1H-NMR analysis of the first precursor and the second precursor. The first precursor shows a phenyl peak of the polymer main chain between 7.0 and 8.0 ppm and a methyl group peak between 1.0 and 3.5 ppm. In the second precursor, the $CH_2$ peak (5) next to Br of the first precursor shifts to around 2.5 ppm, and the peak of the triphenyl portion appears at around 7.0 ppm.

(Preparation of third precursor) A third precursor represented by Chemical Formula 6 was prepared as shown in Scheme 4 below.

[Scheme 4]

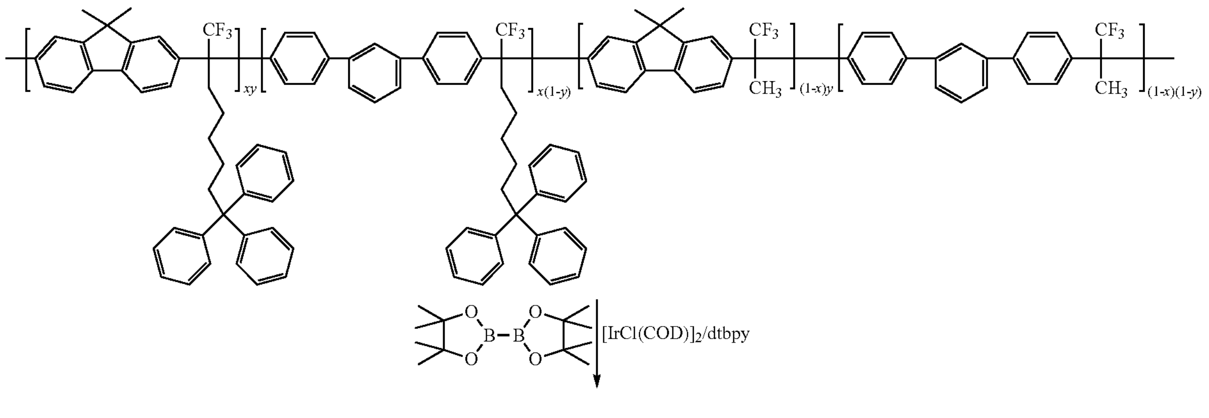

-continued

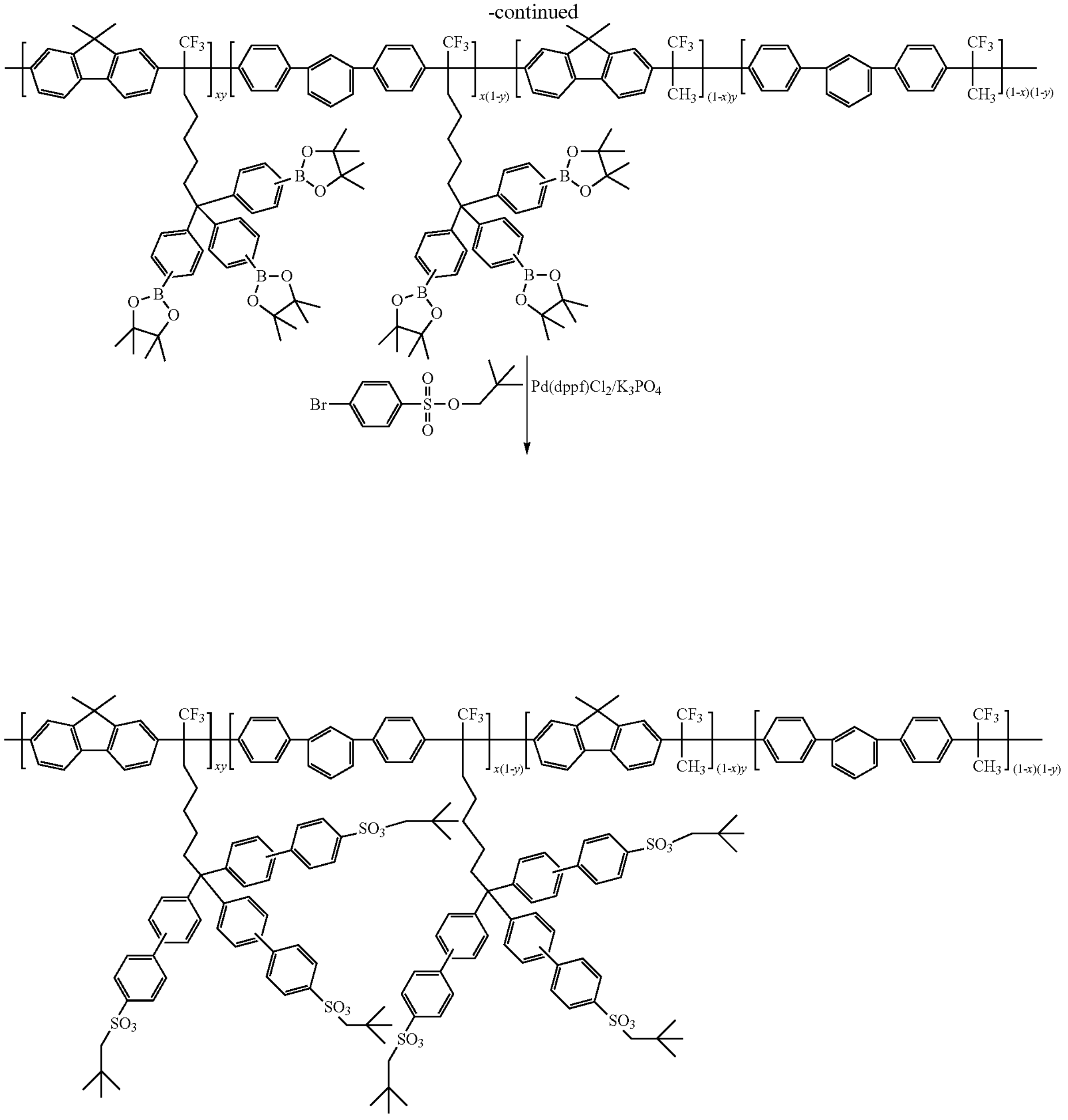

The second precursor (5.5 g) and bis(pinacolato)diboron (13.6 g, 53.5 mmol) as reactants, bis(1,5-cyclooctadiene) diiridium (I) dichloride ($[Ir(cod)Cl]_2$, 0.18 g, 0.27 mmol) and 4,4'-di-tert-butyl-2,2'-dipyridyl (dtbpy, 0.14 g, 0.54 mmol) as catalysts, and THE (40 mL) as a solvent were allowed to react with stirring at about 80° C. for 24 hours to synthesize an intermediate. The reaction product was precipitated in methanol, washed several times with methanol, and dried in a vacuum oven at about 40° C., thereby obtaining an intermediate.

Figure 3:
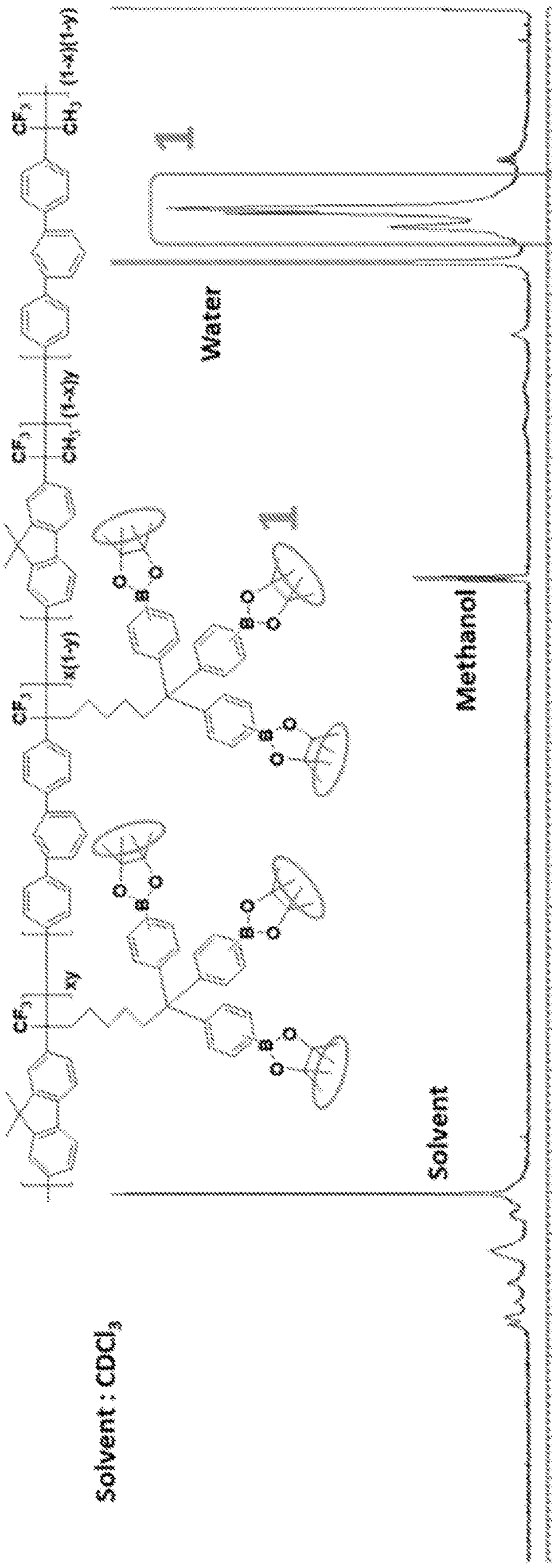
FIG. 3 shows results of 1H-NBR analysis of an intermediate.

FIG. 3 shows results of 1H-NBR analysis of the intermediate. After borylation reaction, a methyl group peak (i) appears at the end of the branch.

The intermediate (6 g) and the monomer having a neopentyl group synthesized above (12.7 g, 41.43 mmol) as reactants, [1,1'-bis(diphenylphosphino)ferrocene]dichloropalladium(II) ($Pd(dppf)Cl_2$, 0.34 g, 0.41 mmol) and $K_3PO_4$ (8.79 g, 41.43 mmol) as catalysts, and THE and $H_2O$ as solvents ($THF:H_2O$=10:1=128 mL:12.8 mL) were allowed to react with stirring at about 80° C. for 24 hours to synthesize a third precursor. The reaction product was precipitated in methanol, washed several times with methanol, and dried in a vacuum oven at about 40° C., thereby obtaining a third precursor.

Figure 4:
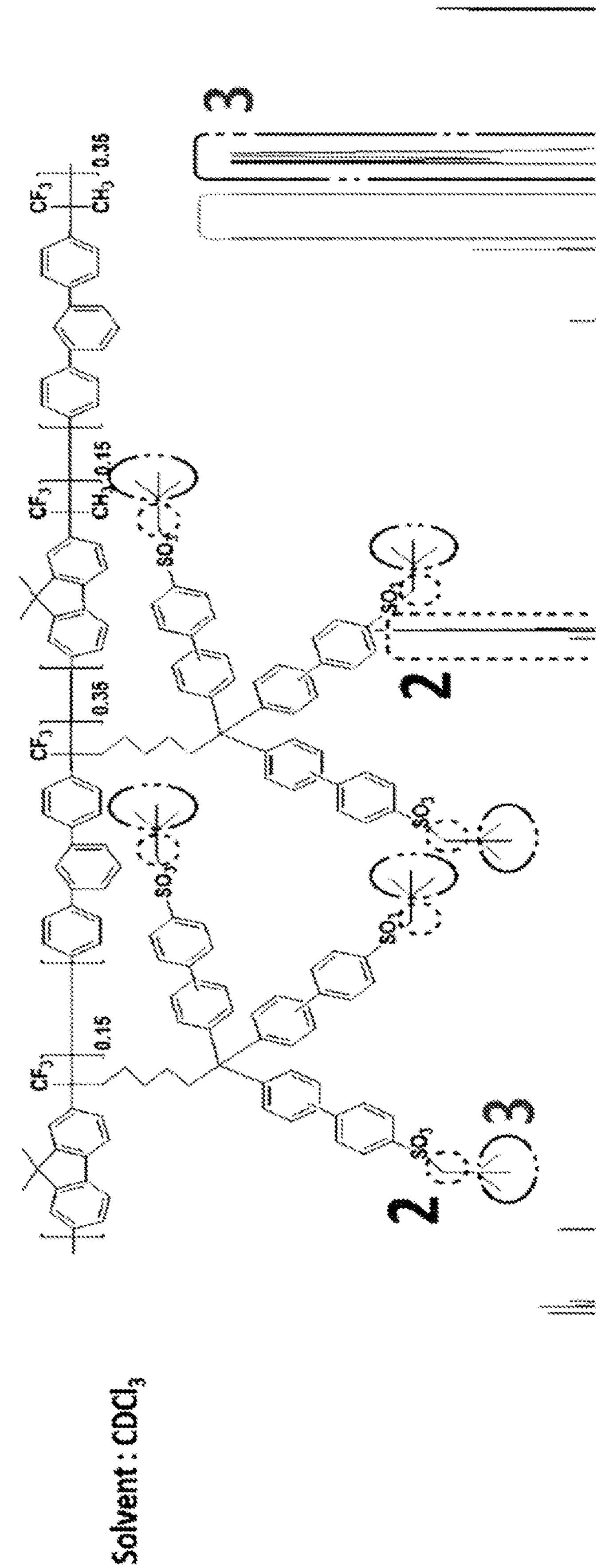
FIG. 4 shows results of 1H-NBR analysis of the third precursor.

FIG. 4 shows results of 1H-NBR analysis of the third precursor. Through Suzuki-Miyaura coupling reaction, pinacolato boron was removed and peak 1 disappeared, and the neopentylsulfonate group was attached to form peaks 2 and 3.

(Preparation of ionomer) An ionomer represented by Chemical Formula 3 was prepared as shown in Scheme 5 below.

[Scheme 5]

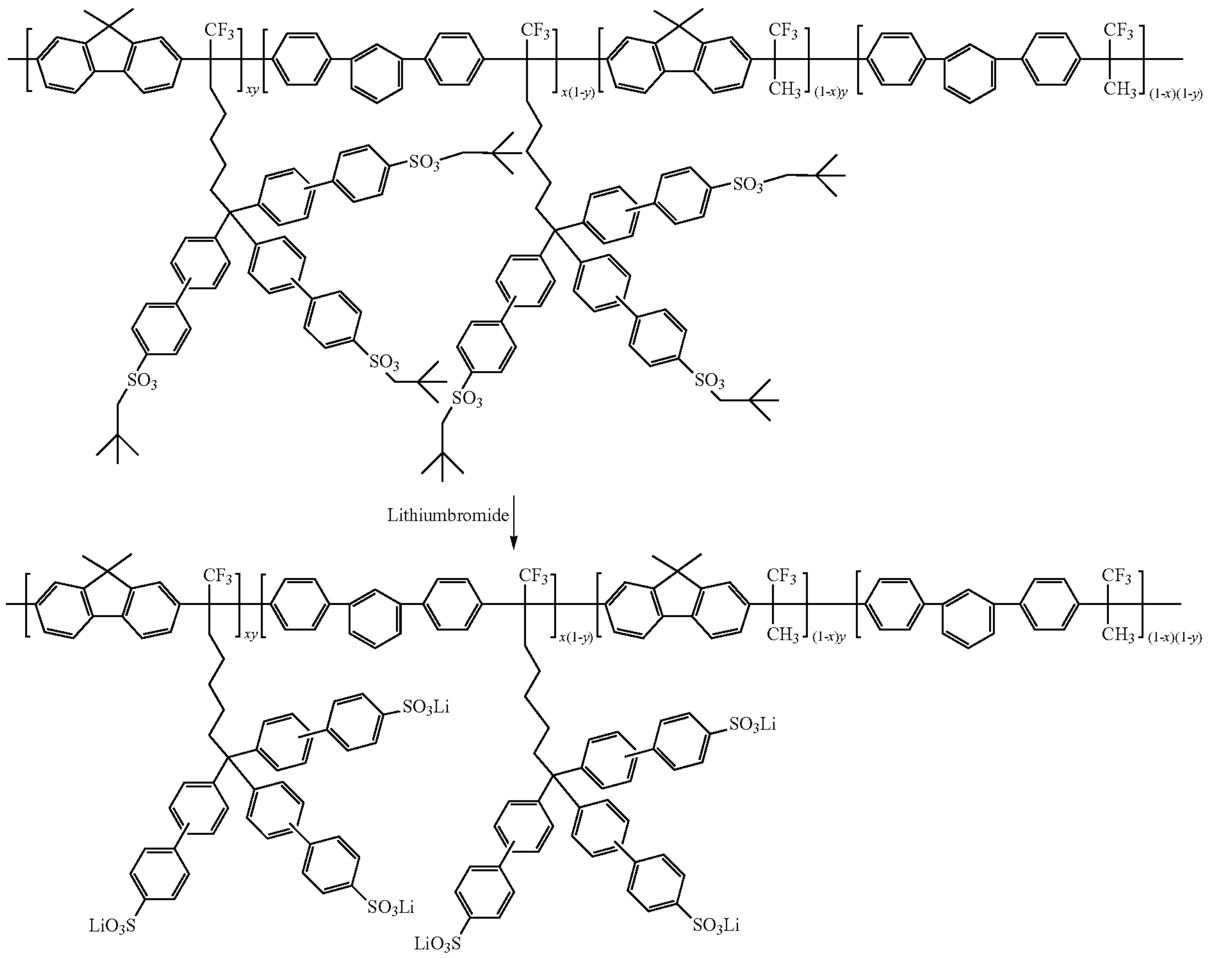

The third precursor (5 g) and LiBr (3-5 g) as reactants and DMAc (50 mL) as a solvent were stirred at about 100° C. for about 24 hours to synthesize an ionomer. The reaction product was precipitated with dichloromethane, washed several times with isopropanol, dried in a vacuum oven at about 40° C., washed several times with distilled water, dissolved in DMAc, and purified through Celite filtering, thereby obtaining an ionomer.

The ionomer obtained in Preparation Example 1 may be an ionomer in which x is 0.3 and y is 0.5 in Chemical Formula 3.

Figure 5:
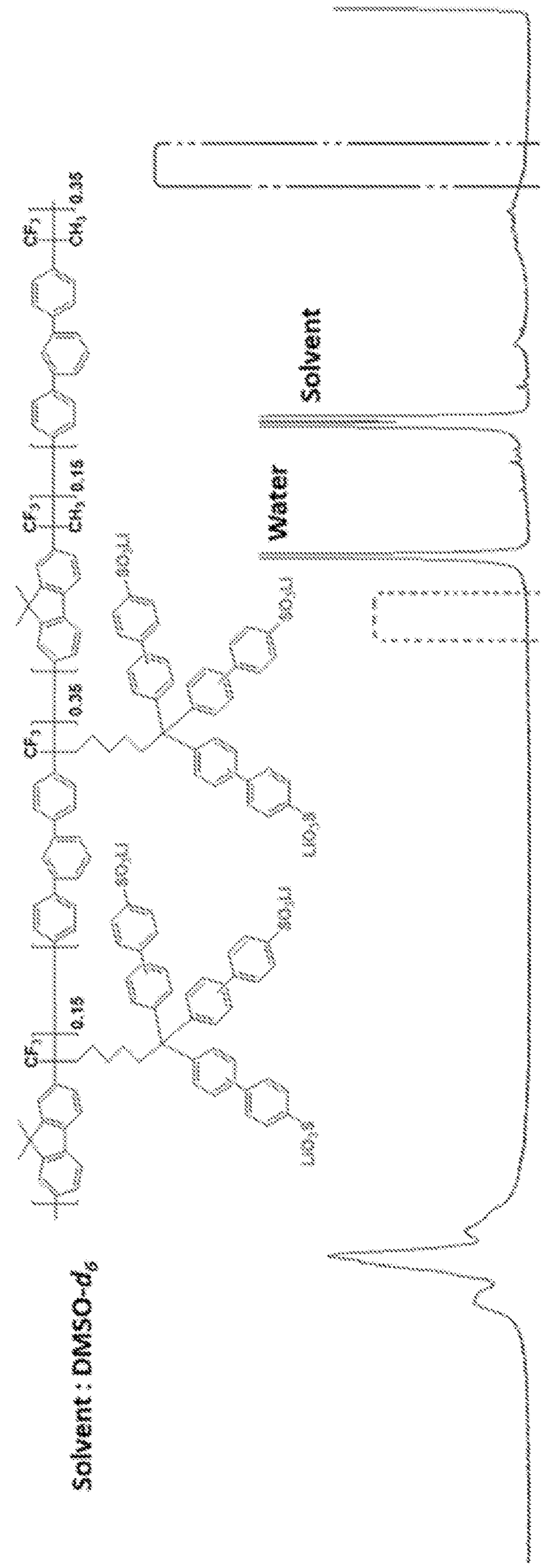
FIG. 5 shows results of 1H-NBR analysis of the ionomer according to Preparation Example 1.

FIG. 5 shows results of 1H-NBR analysis of the ionomer according to Preparation Example 1. It can be confirmed that peaks 2,3 disappeared because the neopentyl group was removed and converted into a sulfonic acid group by LiBr.

Figure 6:
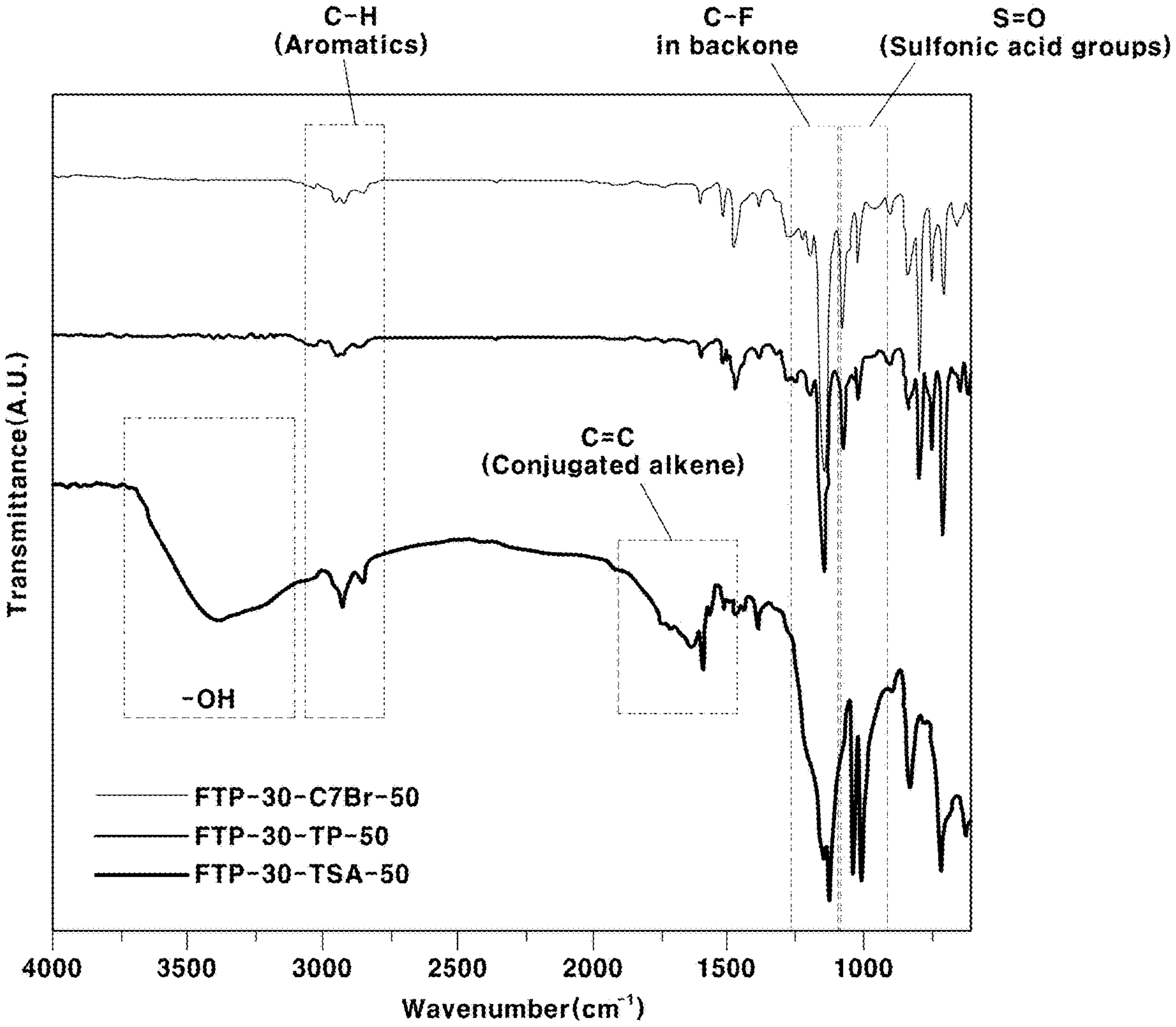
FIG. 6 shows results of Fourier transform infrared spectroscopy (FT-IR) of the ionomer according to Preparation Example 1.

FIG. 6 shows results of Fourier transform infrared spectroscopy (FT-IR) of the ionomer according to Preparation Example 1. When the sulfonic acid group was introduced, —OH peak was observed at about 3400 $cm^{-1}$, and the S═O bond was observed at about 1000 $cm^{-1}$. In addition, at about 1600 $cm^{-1}$, a biphenyl structure was formed at the end of the branch through Suzuki-Miyaura coupling, and a conjugated alkene peak was thus observed.

Figure 7:
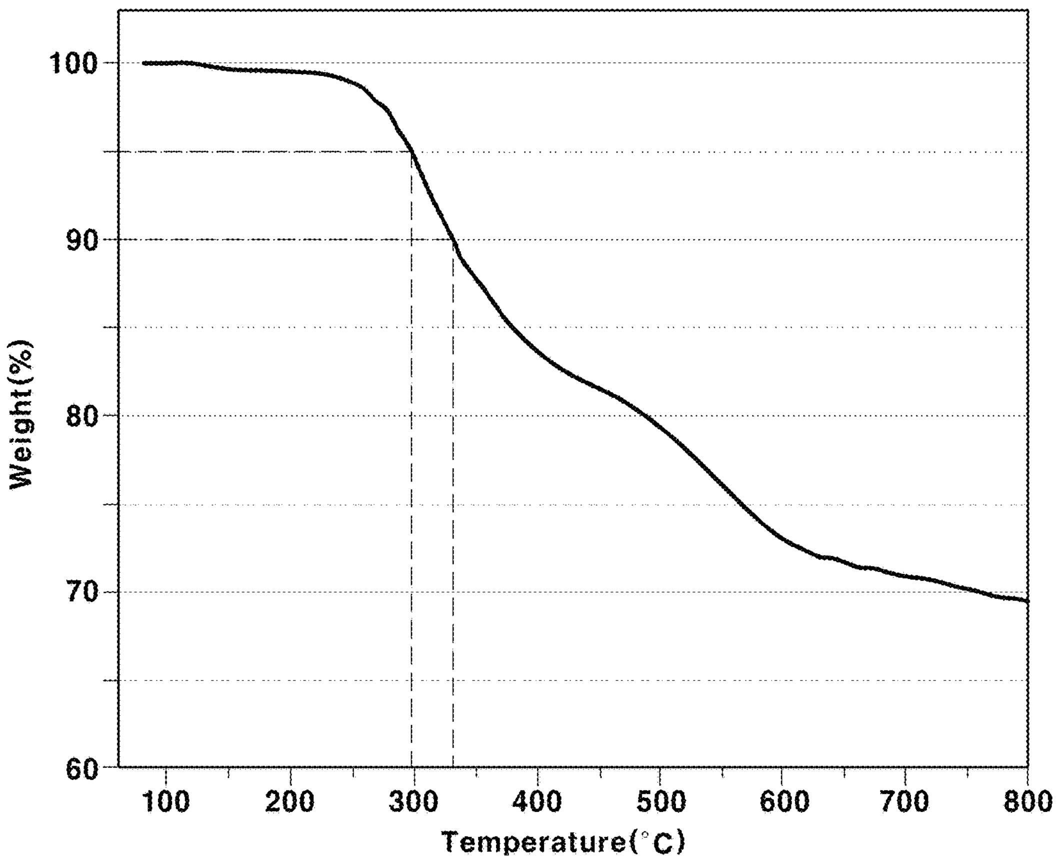
FIG. 7 shows results of thermogravimetric analysis (TGA) of the ionomer according to Preparation Example 1.

FIG. 7 shows results of thermogravimetric analysis (TGA) of the ionomer according to Preparation Example 1. The temperature of the ionomer was raised from room temperature to about 120° C. at about 20° C./min and then maintained for about 10 minutes to remove residual moisture and stabilized. Thereafter, a weight change of the ionomer was measured through heating from about 60° C. to 800° C. at about 10° C./min in a nitrogen atmosphere after cooling to about 6° C. at about 20° C./min. 5% decomposition was observed at about 269° C. and 10% decomposition was observed at about 331° C.

Figure 8:
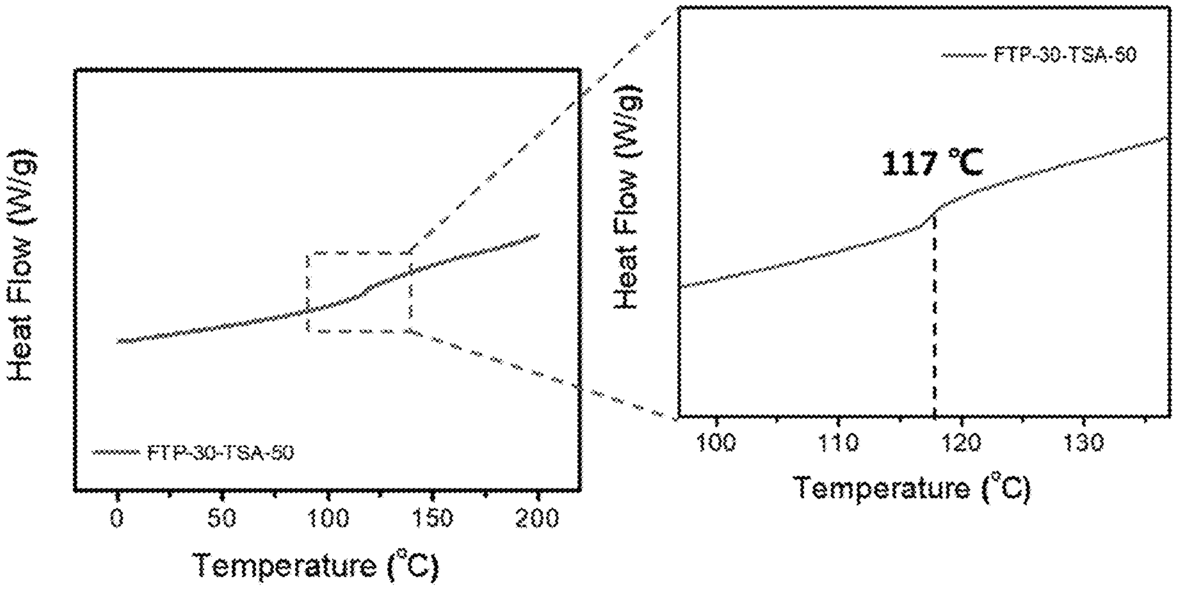
FIG. 8 shows results of differential scanning calorimetry (DSC) of the ionomer according to Preparation Example 1.

FIG. 8 shows results of differential scanning calorimetry (DSC) of the ionomer according to Preparation Example 1. After raising the temperature of the ionomer from about 40° C. to 200° C. at a rate of about 20° C./min in a nitrogen atmosphere, temperature equilibrium was maintained for about 1 minute. Thereafter, the temperature of the ionomer was lowered to about −20° C. at a rate of about −20° C./min, temperature equilibrium was maintained for about 10 minutes, and then the temperature was raised to about 200° C. at a rate of about 10° C./min. A change in the slope was observed at about 117° C., indicating that the glass transition temperature (Tg) of the ionomer was about 117° C.

Figure 9:
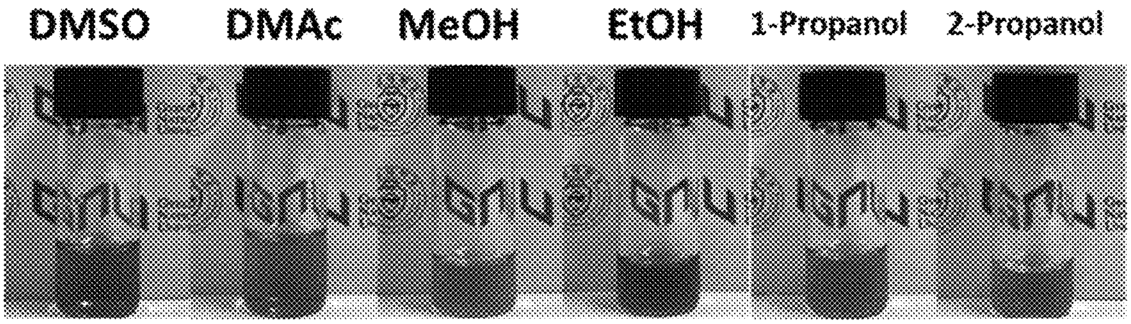
FIG. 9 shows results of a solubility test of the ionomer according to Preparation Example 1.

FIG. 9 shows results of the solubility test of the ionomer according to Preparation Example 1. It can be confirmed that the ionomer was easily soluble not only in aprotic solvents such as DMSO and DMAc but also in alcoholic solvents such as MeOH, EtOH, 1-propanol, and 2-propanol.

Preparation Example 2

An ionomer was prepared in the same manner as in Preparation Example 1, with the exception that 9,9-dimethylfluorene, m-terphenyl, 7-bromo-1,1,1-trifluoroheptan-2-one, and 1,1,1-trifluoroacetone were weighed so that x was 0.3 and y was 0.4 in Chemical Formula 3 when preparing the first precursor compared to Preparation Example 1.

Preparation Example 3

An ionomer was prepared in the same manner as in Preparation Example 1, with the exception that 9,9-dimethylfluorene, m-terphenyl, 7-bromo-1,1,1-trifluoroheptan-2-one, and 1,1,1-trifluoroacetone were weighed so that x was 0.1 and y was 0.4 in Chemical Formula 3 when preparing the first precursor compared to Preparation Example 1.

Example 1

Figure 10:
FIG. 10 shows results of visual observation of the electrolyte membrane according to Example 1.

An electrolyte membrane was manufactured using the ionomer according to Preparation Example 1. A solution was prepared by mixing 0.5 g of the ionomer, 2.0 g of methanol, and 0.2 g of DMSO. The solution was cast on a glass plate, dried at about 65° C. for about 1 hour without vacuum in a vacuum oven and then dried under vacuum for about 30 minutes to form an electrolyte membrane. The electrolyte membrane was separated from the glass plate through a water infiltration method and incorporated into a 1 M $H_2SO_4$ aqueous solution at about 60° C. for about 6 hours. Thereafter, the electrolyte membrane was washed several times with distilled water and dried at room temperature and normal humidity. FIG. 10 shows results of visual observation of the electrolyte membrane according to Example 1.

Figure 11:
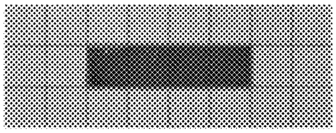
FIG. 11 shows results of measurement of water uptake and dimensional change of the electrolyte membrane according to Example 1.
Figure 11:
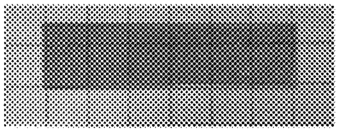

FIG. 11 shows results of measurement of the water uptake and dimensional change of the electrolyte membrane according to Example 1. The electrolyte membrane dried at room temperature and normal humidity was cut to a size of 1 cm×3 cm, and the thickness and weight thereof were measured. The dried electrolyte membrane was placed in a vial, filled with distilled water, and then placed in a drying oven at about 30° C. After about 12 hours, the swollen electrolyte membrane was taken out of the oven, the area, thickness, and weight thereof were measured, and the dimensional change was evaluated using Equation below.

$$\text{Water uptake}[\%]=[(W_{wet}-W_{dry})/W_{dry}]\times 100$$

$$\text{Dimensional change}[\%]=[((A_{wet}\times T_{wet})-(A_{dry}\times T_{dry}))/(A_{dry}\times T_{dry})]\times 100$$

$W_{dry}$ and $W_{wet}$ are the weights of the dried electrolyte membrane and the swollen electrolyte membrane, respectively.

$A_{dry}$ and $A_{wet}$ are the areas of the dried electrolyte membrane and the swollen electrolyte membrane, respectively.

$T_{dry}$ and $T_{wet}$ are the thicknesses of the dried electrolyte membrane and the swollen electrolyte membrane, respectively.

Figure 12:
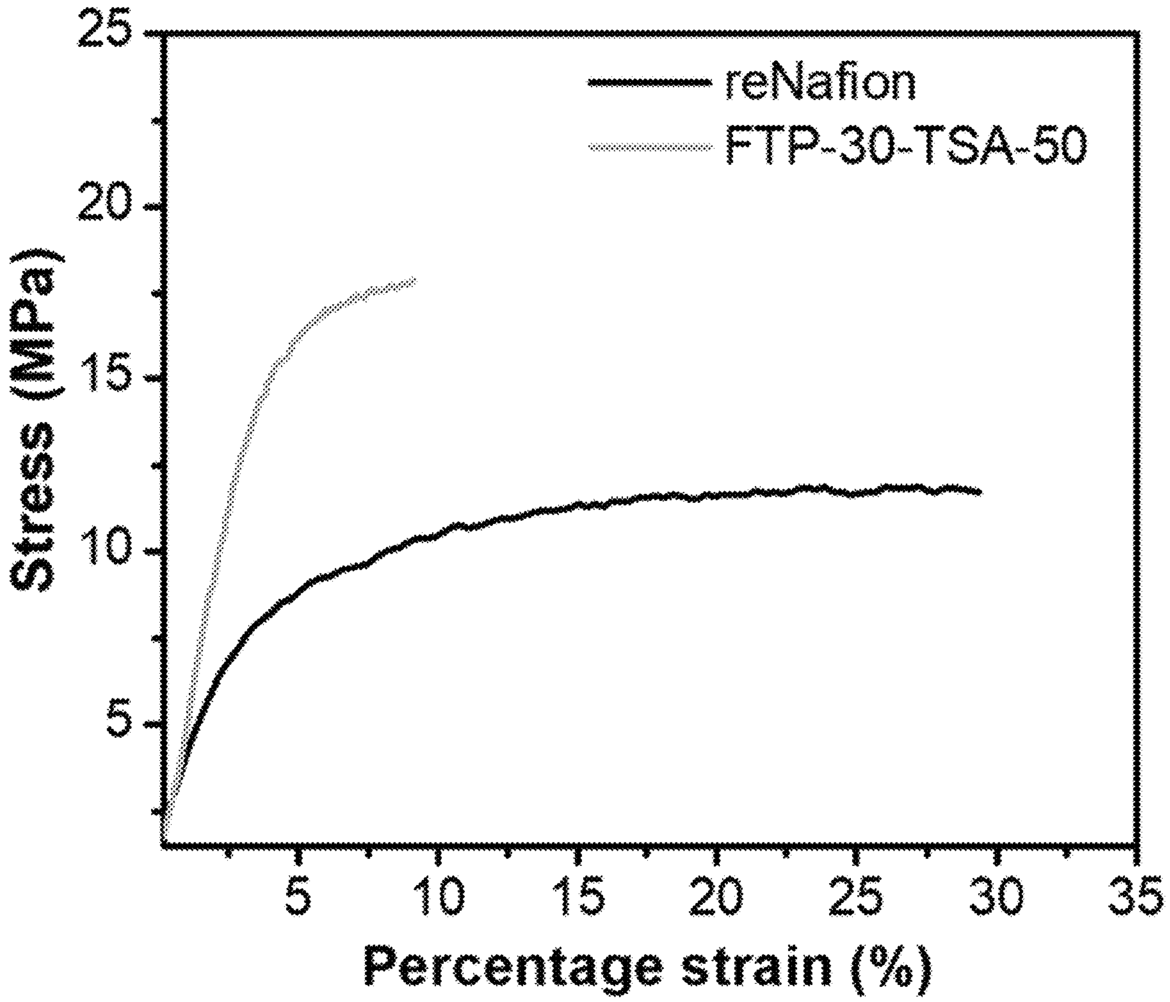
FIG. 12 shows results of measurement of mechanical properties of the electrolyte membrane according to Example 1.

FIG. 12 shows results of measurement of the mechanical properties of the electrolyte membrane according to Example 1. After mounting the load cell of 250 N to a LLOYD UTM LS1, the specimen according to ASTM D-638 Type V was connected thereto. The strain-stress curve, Young's modulus, and elongation of three of each type of electrolyte membrane were measured at an extension rate of 5 mm/min, and the average and standard deviation thereof were calculated. The results thereof are shown in Table 1 below.

TABLE 1

| Classification | Tensile Strength [MPa] | Young's Modulus [MPa] | Elongation at Break [%] |
|---|---|---|---|
| reNafion | 11.93 ± 0.10 | 250.38 ± 31.4 | 31.97 ± 1.71 |
| Example 1 | 17.95 ± 1.68 | 580.72 ± 63.72 | 10.64 ± 1.38 |

Compared to Nafion, the electrolyte membrane of Example 1 exhibited lower elongation but increased tensile strength.

Examples 2 and 3

Electrolyte membranes were manufactured in the same manner as in Example 1, with the exception of using the ionomers of Preparation Example 2 and Preparation Example 3, respectively.

Figure 13:
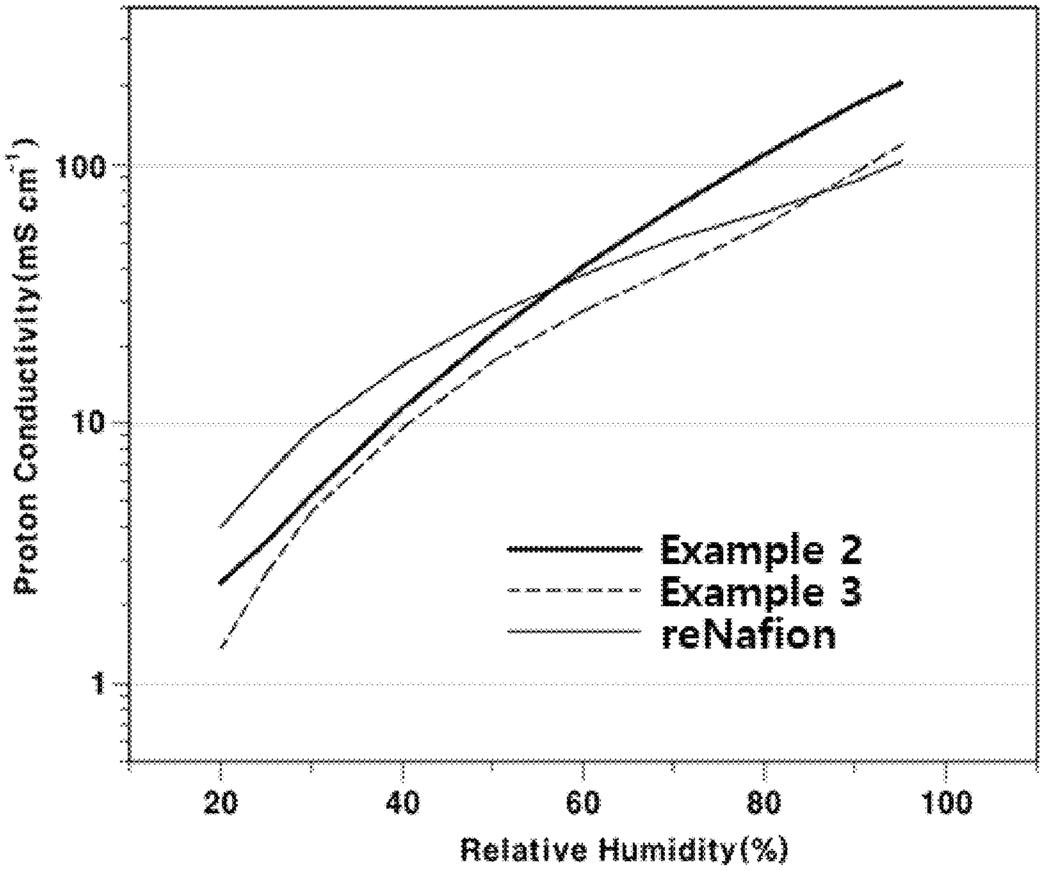
FIG. 13 shows results of measurement of proton conductivity of the electrolyte membranes according to Examples 2 and 3.

FIG. 13 shows results of measurement of the proton conductivity of the electrolyte membranes according to Examples 2 and 3. A sample having a size of 0.5×3 $cm^2$ was manufactured and connected to a 4-probe cell, and proton conductivity thereof was measured with a BekkTech BT-552MX. Proton conductivity was measured at 80° C. and in the entire humidity range. The relative humidity was calculated through the following equation using the ratio of the vapor pressure P(Td) at the dew point of water and the saturated vapor pressure of gas at 80° C.

$$RH\,(\%)=P(Td)/P(Ts)\times 100$$

Before measurement, temperature/humidity equilibrium was maintained for 2 hours at 80° C. and 70% RH, the humidity was decreased from 70% RH to 20% RH, and proton conductivity was measured. Also, the humidity was increased from 20% RH to 100% RH, and proton conductivity was measured. The RH section was adjusted to 10%, the resistance value was measured every 10% RH, and the proton conductivity value was calculated using the plane direction proton conductivity measurement equation. Humidity equilibrium was maintained for 15 minutes in each humidity condition. The proton conductivity values determined at different humidity values were recorded. The results thereof are shown in Table 2 below.

TABLE 2

| Classi- | Proton conductivity at specific relative humidity [mS/cm] | | | |
|---|---|---|---|---|
| fication | 30% | 50% | 70% | 90% |
| Example 2 | 5.4 | 22.2 | 66.8 | 168.7 |
| Example 3 | 4.7 | 17.6 | 39.3 | 94.3 |
| reNafion | 9.6 | 26.4 | 50.8 | 87.2 |

Example 2 exhibited lower proton conductivity than Nafion at a relative humidity of 80% or less, but higher proton conductivity than Nafion at a relative humidity of 90% or more.

Example 3 exhibited lower proton conductivity than Nafion at a relative humidity of 50% or less, but higher proton conductivity than Nafion at a relative humidity of 60% or more. In particular, at a relative humidity of 90%, proton conductivity of Example 3 was about twice as high as that of Nafion.

As is apparent from the above description, according to the present disclosure, an ionomer having excellent chemical stability and high proton conductivity can be obtained.

According to the present disclosure, an ionomer having high solubility in various solvents such as an aprotic solvent, an alcoholic solvent, and the like can be obtained.

The effects of the present disclosure are not limited to the above-mentioned effects. It should be understood that the effects of the present disclosure include all effects that can be inferred from the description of the present disclosure.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. An ionomer comprising:

a partial structure represented by:

[Chemical Formula 1]

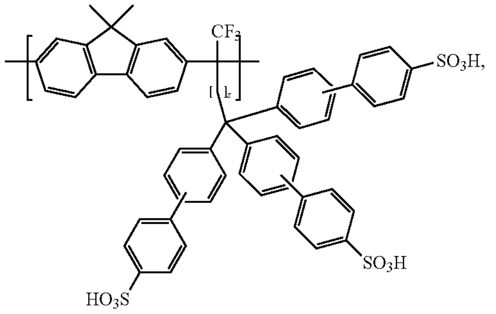

-continued or

[Chemical Formula 2]

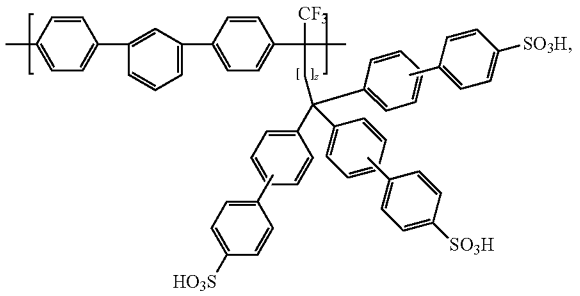

wherein z is an integer of 1 to 10.

2. The ionomer of claim 1, wherein z is an integer of 1 to 5.

3. The ionomer of claim 1, wherein z is an integer of 5-10.

4. The ionomer of claim 1, wherein the ionomer is represented by:

[Chemical Formula 3]

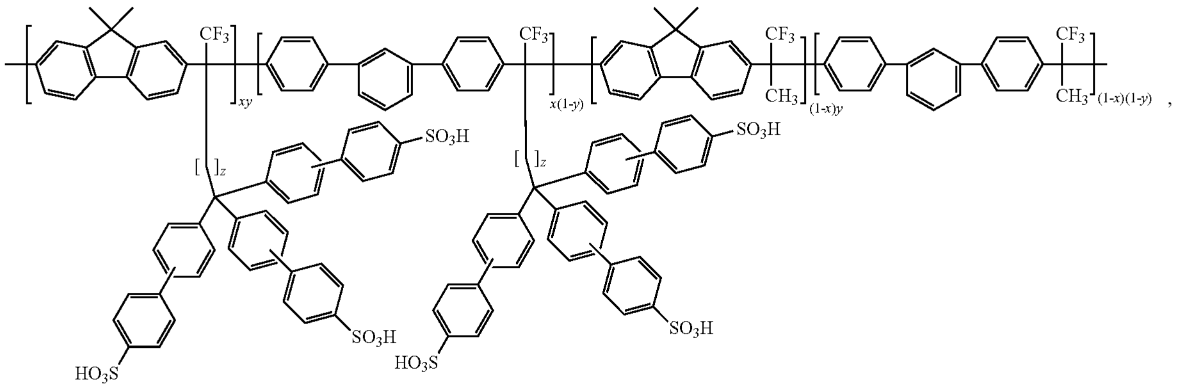

and wherein x satisfies $0<x\leq 1$, y satisfies $0\leq y\leq 1$, and z is an integer of 1 to 10.

5. The ionomer of claim 4, wherein, in Chemical Formula 3, x satisfies $0.1\leq x\leq 0.3$.

6. The ionomer of claim 4, wherein, in Chemical Formula 3, y satisfies $0.4\leq y\leq 0.5$.

7. The ionomer of claim 4, wherein, in Chemical Formula 3, x satisfies $0.1\leq x\leq 0.3$ and y satisfies $0.4\leq y\leq 0.5$.

8. A fuel cell comprising:

an electrolyte membrane;

a cathode disposed on one surface of the electrolyte membrane; and an anode disposed on another surface of the electrolyte membrane, wherein at least one of the electrolyte membrane, the cathode, and the anode comprises the ionomer of claim 1.

9. A method for preparing an ionomer for a fuel cell, the method comprising:

preparing a first precursor by reacting a fluorene-based monomer, a terphenyl-based monomer, and a hydrocarbon compound;

preparing a second precursor by reacting the first precursor with a triphenyl-based monomer;

preparing a third precursor represented by Chemical Formula 6 by introducing a monomer having a sulfonic acid protecting group into the second precursor; and obtaining the ionomer represented by Chemical Formula 3 by removing the sulfonic acid protecting group from the third precursor, wherein [Chemical Formula 6] is represented by:

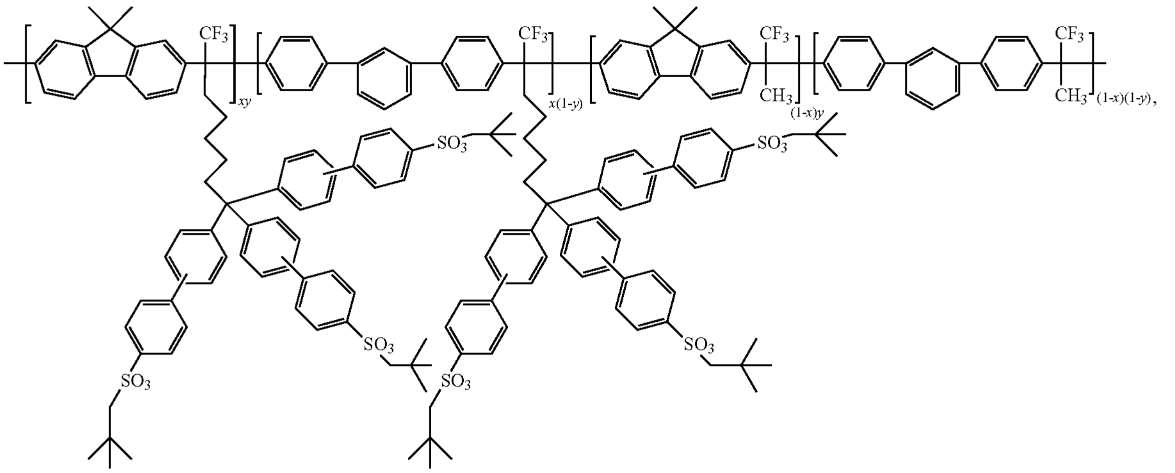

wherein [Chemical Formula 3] is represented by:

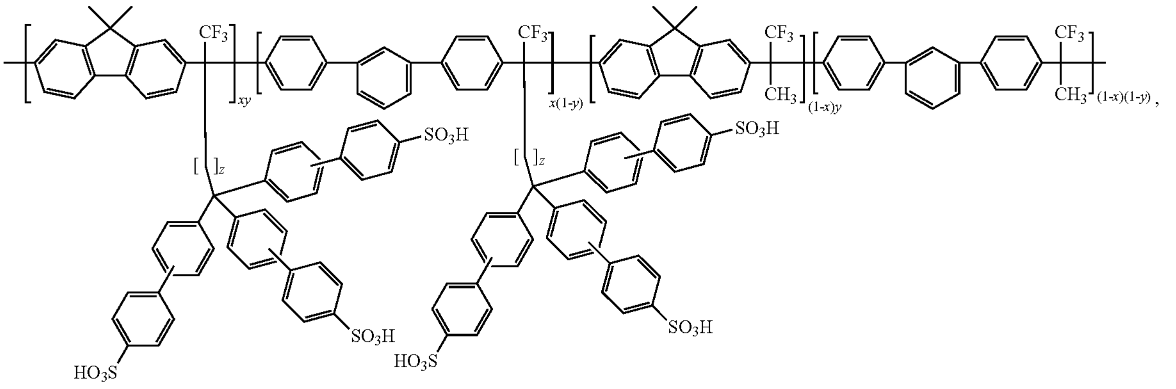

wherein x satisfies $0<x\leq 1$, y satisfies $0\leq y\leq 1$, and z is an integer of 1 to 10.

10. The method of claim 9, wherein the first precursor is represented by Chemical Formula 4:

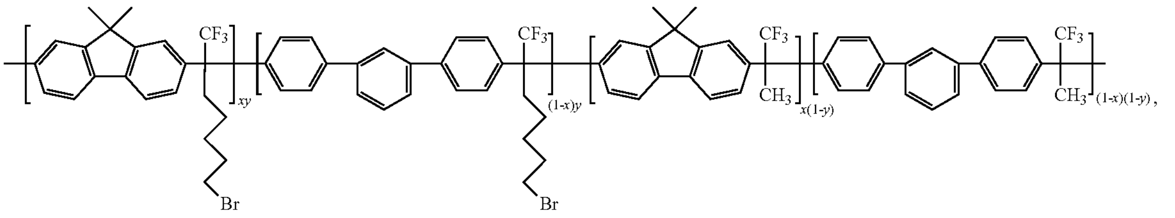

and wherein x satisfies 0<x≤1 and y satisfies 0≤y≤1.

11. The method of claim 9, wherein the second precursor is represented by Chemical Formula 5:

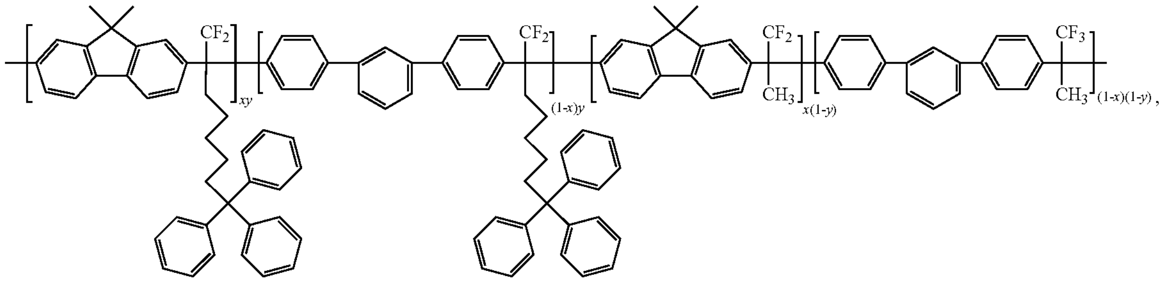

and wherein x satisfies 0<x≤1 and y satisfies 0≤y≤1.

12. The method of claim 9, wherein the monomer having the sulfonic acid protecting group is represented by Chemical Formula 6a:

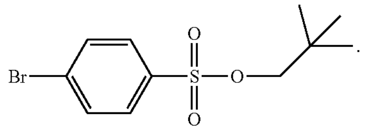 [SMILES: CC(C)(C)COS(=O)(=O)c1ccc(Br)cc1]

13. The method of claim 9, wherein, in Chemical Formula 3, x satisfies 0.1≤x≤0.3.

14. The method of claim 9, wherein, in Chemical Formula 3, y satisfies 0.4≤y≤0.5.

15. The method of claim 9, wherein, in Chemical Formula 3, x satisfies 0.1≤x≤0.3 and y satisfies 0.4≤y≤0.5.

16. An ionomer comprising:

a partial structure represented by:

[Chemical Formula 1]

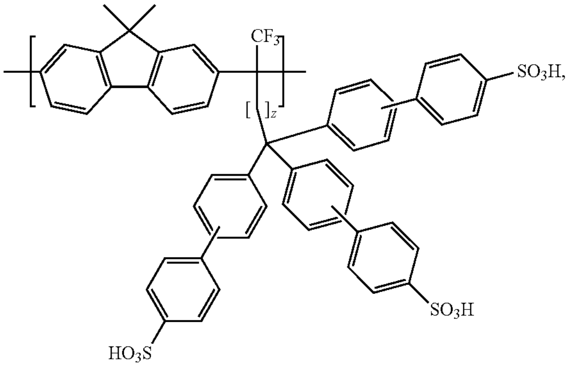

wherein z is an integer of 1 to 10.

17. The ionomer of claim 16, wherein z is an integer of 1 to 5.

18. The ionomer of claim 16, wherein z is an integer of 5-10.

19. A fuel cell comprising:

an electrolyte membrane;

a cathode disposed on one surface of the electrolyte membrane; and an anode disposed on another surface of the electrolyte membrane, wherein at least one of the electrolyte membrane, the cathode, and the anode comprises the ionomer of claim 16.

* * * * *